Oct. 1, 1935.　　　A. R. MUIRHEAD　　　2,016,017
COTTON HANDLING APPARATUS
Filed Dec. 28, 1932　　7 Sheets-Sheet 1

Inventor
Alfred R. Muirhead
By Eugene E. Stevens
His Attorney

Oct. 1, 1935.  A. R. MUIRHEAD  2,016,017
COTTON HANDLING APPARATUS
Filed Dec. 28, 1932    7 Sheets-Sheet 4

Inventor
Alfred R. Muirhead
By Eugene B. Stevens
His Attorney

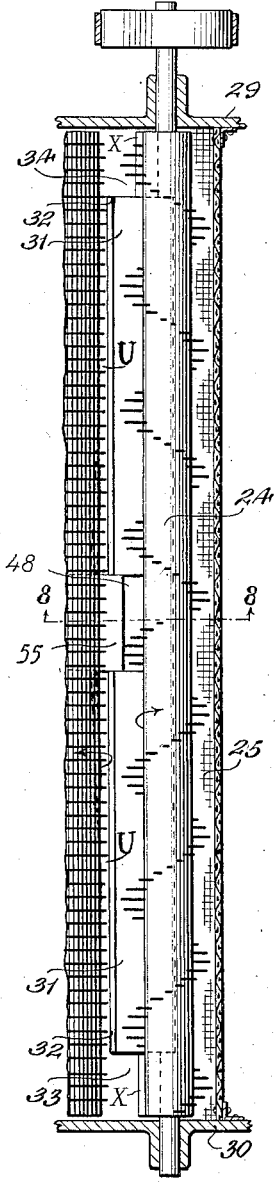
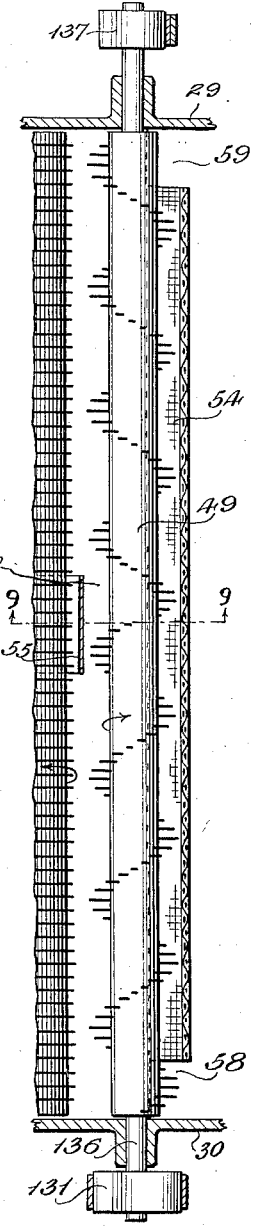

Oct. 1, 1935.   A. R. MUIRHEAD   2,016,017
COTTON HANDLING APPARATUS
Filed Dec. 28, 1932   7 Sheets-Sheet 6

Inventor
Alfred R. Muirhead
By Eugene Stevens
His Attorney

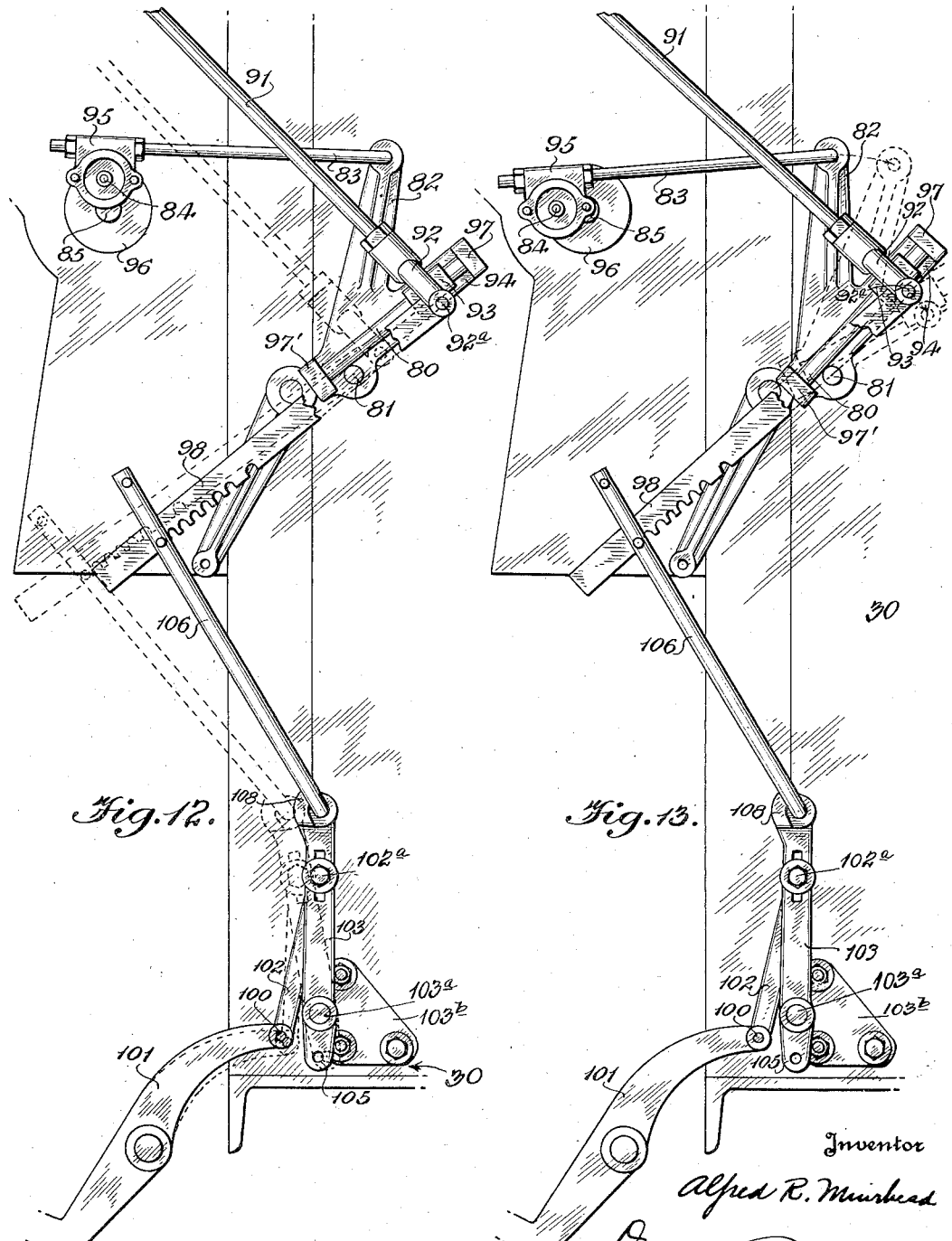

Patented Oct. 1, 1935

2,016,017

UNITED STATES PATENT OFFICE 2,016,017

COTTON HANDLING APPARATUS

Alfred R. Muirhead, Columbus, Ga., assignor to Lummus Cotton Gin Company, Columbus, Ga., a corporation of Georgia Application December 28, 1932, Serial No. 649,218

13 Claims. (Cl. 19—37)

The invention relates to improvements in cotton handling apparatus, and more particularly to a combined apparatus adapted to serve as a cotton feeder, hull separator and cleaner for cotton gins.

One of the objects of the invention is to provide a combined apparatus of the character referred to above, having distinct feeding, cleaning and hull separating sections, and means whereby the cotton may be passed either directly from the feeder section of the device to the gin, or may be passed through both the feeding and cleaning sections of the apparatus and thence to the gin, or may be passed successively through the feeding, hull separating and cleaning sections, depending on the condition of the cotton undergoing treatment.

A further object of the invention is to provide means for cutting off or applying power to the separating section at the will of the operator without interfering with the operation of the feeding and cleaning sections of the apparatus.

A further object of the invention is to improve the separator section of the apparatus; and more particularly to provide means whereby a large proportion of the hulls separated from the cotton by the picker and stripper rollers and the saws may be removed from the cotton at an early stage, and the cotton then subjected to cleaning and the hulls subjected to further treatment to remove any remaining cotton.

A still further object is to provide means for adjusting the position of the stripper roller with reference to the saws, depending on the quality of the cotton being treated.

Additionally, the invention contemplates a novel hull-deflecting means in association with a stripper roll or the equivalent; and further provides blower-providing means in association with the stripper roll for very largely preventing the passage of trash, etc., with the cotton to the cleaning section.

Still another object of the invention is to provide means for regulating the feed of cotton to the apparatus, and more particularly to provide means for automatically regulating the feed according to conditions existing in an automatic gin breast with which the present apparatus is preferably combined.

Other objects will appear hereinafter.

The invention will be more readily understood by reference to the accompanying drawings, in which, Fig. 1 is a vertical section through the improved apparatus showing the combined feeding, separating and cleaning elements, and showing also in elevation an automatic gin breast supplied by the apparatus;

Figure 1:
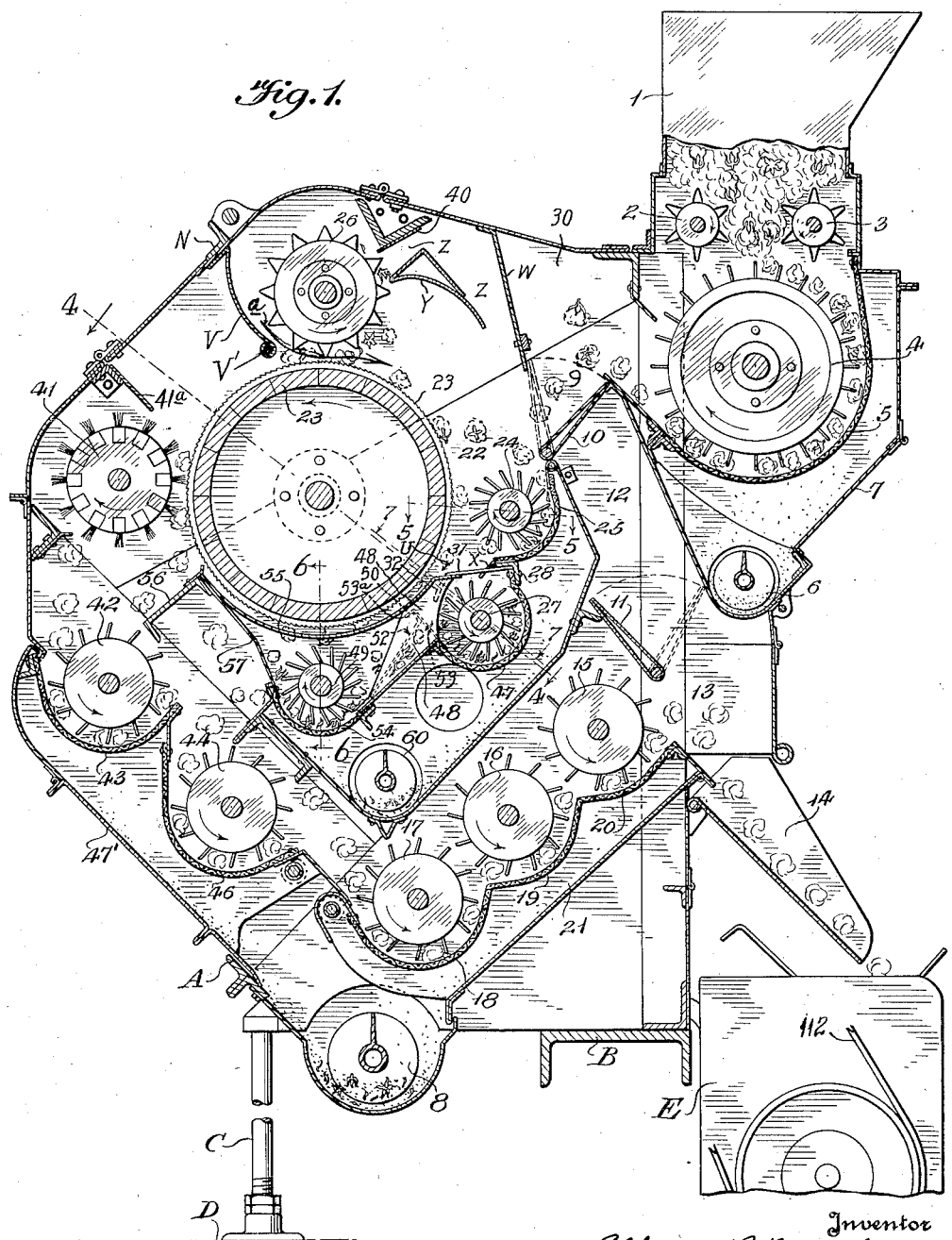
Figure 7:
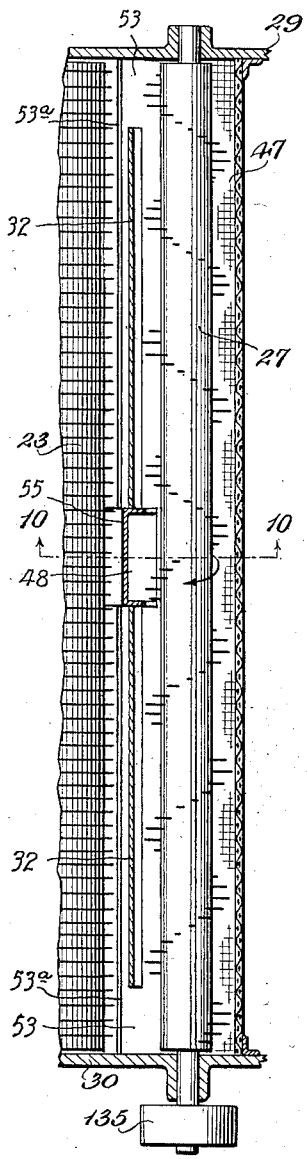
Figure 8:
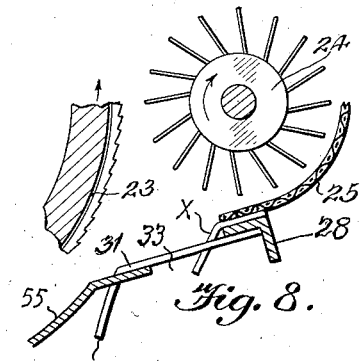
Figure 9:
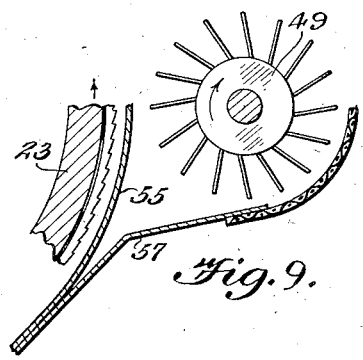
Figure 10:
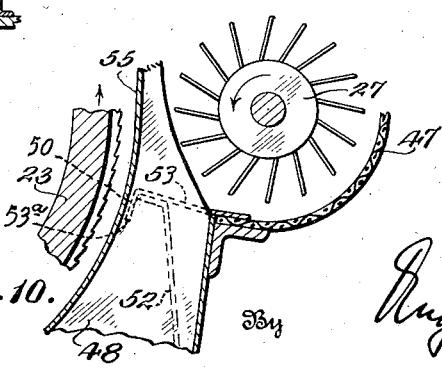
Figure 11:
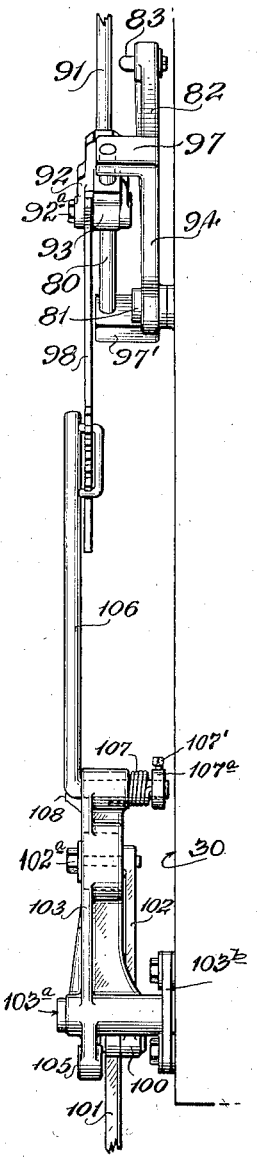

Figs. 5, 6 and 7 are sections taken respectively on lines 5—5, 6—6, and 7—7 of Fig. 1;

Figs. 8, 9 and 10 are sections taken on lines 8—8, 9—9 and 10—10 of Figs. 5, 6 and 7, respectively, and Figs. 11, 12 and 13 are detail views showing portions of the automatic feeder regulating mechanism in different operating positions thereof.

General assembly

Figure 2:
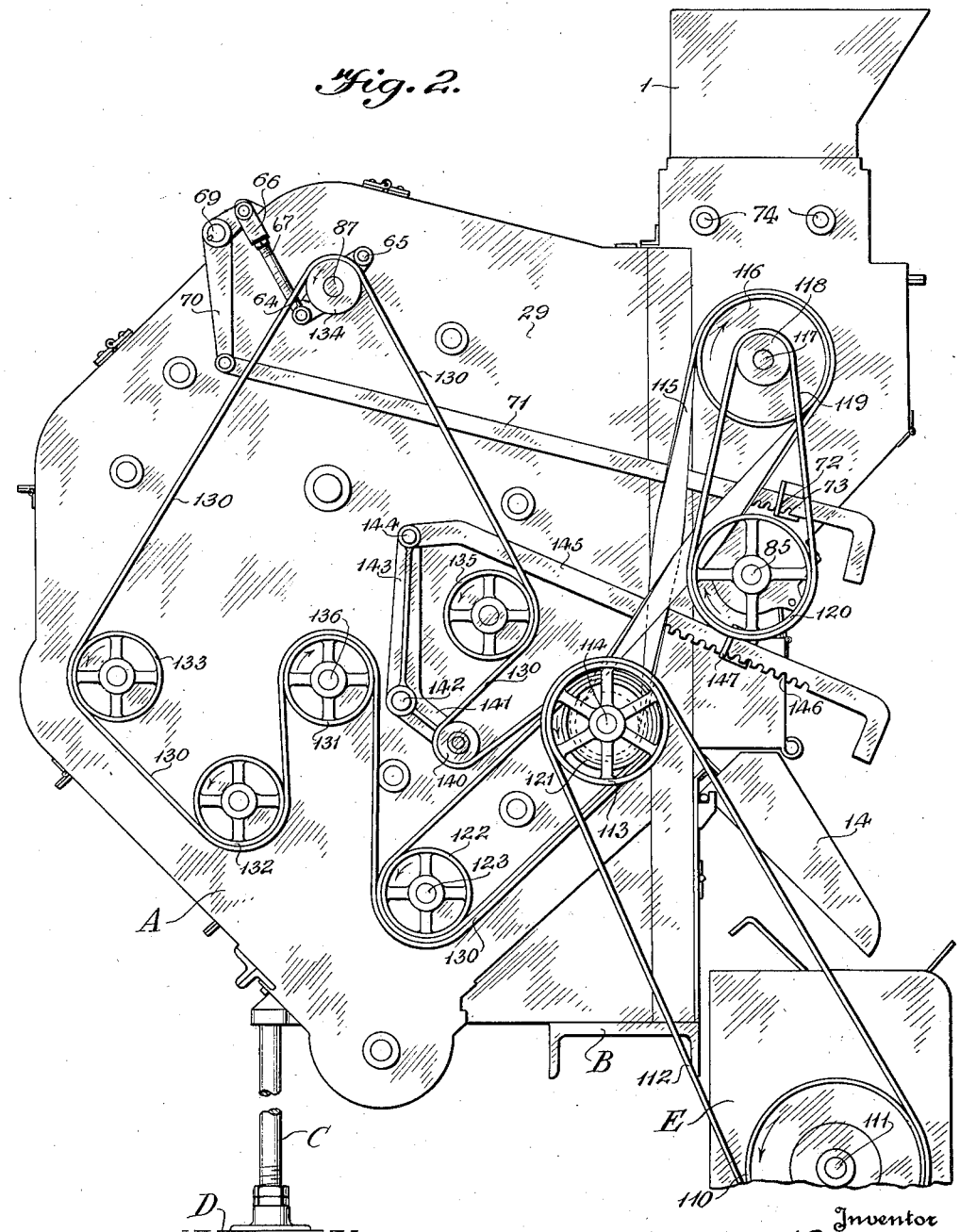
Fig. 2 is a side elevation of the same apparatus.
Figure 3:
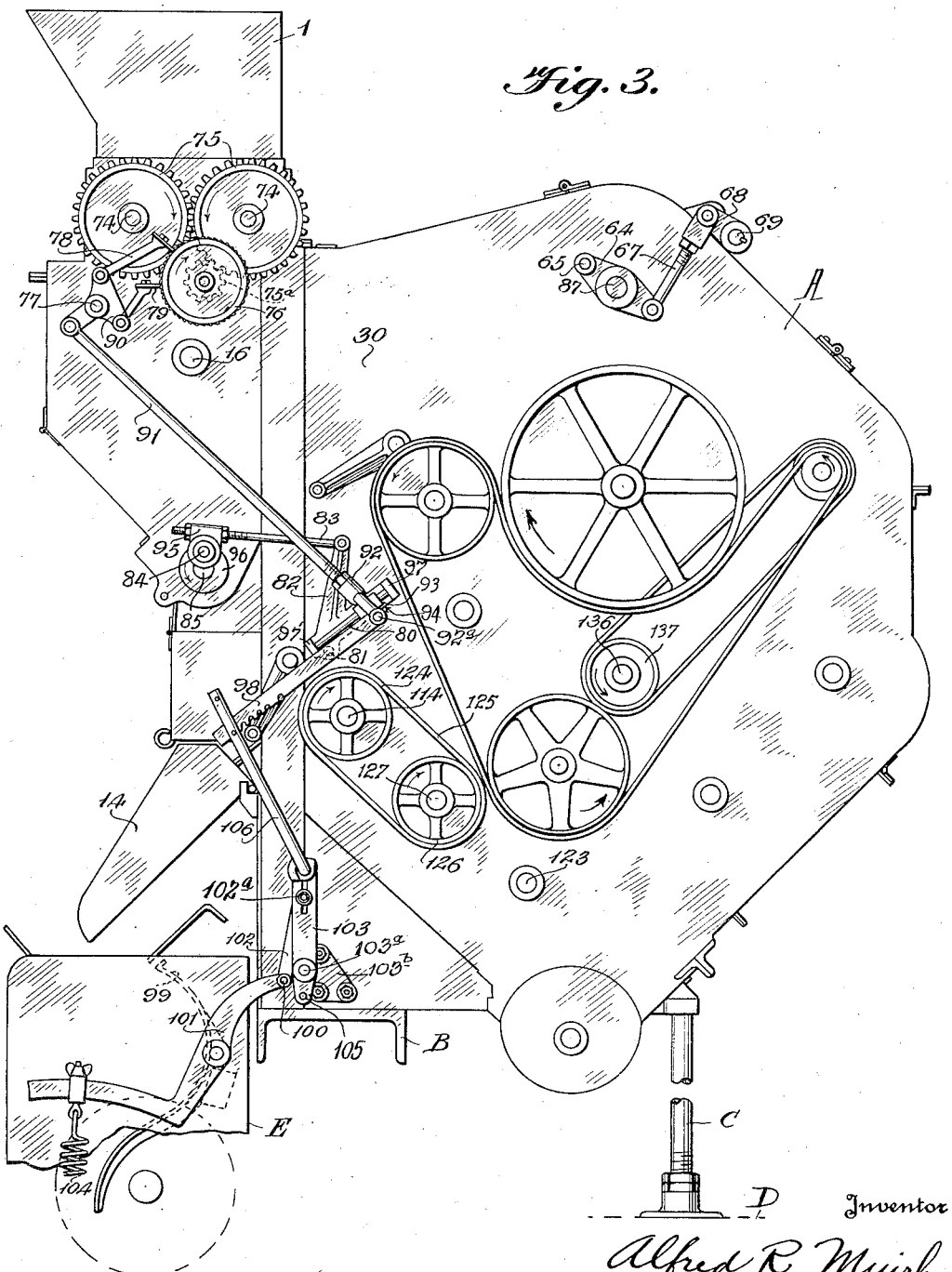
Fig. 3 is likewise an elevation, but looking from the opposite side than Fig. 2.

Referring particularly to Figs. 1, 2 and 3, A denotes a casing or housing for the mechanism of the combined feeder, hull separator and cleaner. As shown, the casing is supported upon a transverse beam B and upon an adjustable supporting post C, which may be raised or lowered for leveling the separator. The post C rests upon the gin housing floor D. Cotton cleaned and separated from hulls and the like is discharged from the cotton handling device A into a suitable gin which, as herein shown, is equipped with an automatic gin breast E of any suitable type.

Feeder section

As shown in Fig. 1, seed cotton is delivered to a feed hopper 1, which contains two feed rollers 2 and 3. These rollers compress the cotton into a bat, and very slowly this bat of cotton is fed against the spikes of a more rapidly revolving picker roller 4, which beats the locks of cotton loose from the bat and starts a uniform flow of cotton through the machine. As the cotton together with the hulls, stems, leaves, sand and other foreign matter that may be mixed with it, is carried by the picker roller 4 over the surface of a screen 5 located beneath the roller, a great portion of the foreign matter is removed by passing through the screen and falling down to a conveyor 6 in the bottom of a hopper 7. This conveyor 6 conveys this sand and trash to one end of the feeder and delivers it to a larger conveyor 8 at the bottom of the machine through a spout of usual construction, not shown in the drawings. This above-described apparatus constitutes the feeder section of my machine. This section may be, and as herein described is of the usual design, and forms no part of my invention, except in combination with the other features of the machine.

Selectively operated valves

The cotton, having been partially cleaned of sand and small particles of leaf trash, etc., with the feeder section, is thrown by the picker roller 4 into a hopper or space 9 at the bottom of which is located the by-pass valve 10. When the valve is in the dotted position, the cotton falls directly to the valve 11 at the bottom of the passage 12. The valve 11 is also a by-pass valve, and when in the full line position herein shown, the cotton falls down through the opening or passage 13 to the feeder apron 14 and into the gin breast E. With the valves 10 and 11 in the above-described positions, the cotton is delivered through the feeder to the gin in the usual way with only partial cleaning by the screen 5, which, however, is sufficient for early and newly-opened cotton. If more cleaning is desired, then by placing valve 11 in the dotted position, the cotton is passed down over the tops of three cleaning rollers 15, 16 and 17, around roller 17 and up over screens 18, 19 and 20, where the cleaned cotton is delivered to passage 13 and thence to the gin by apron 14. The sand, leaf trash, and other foreign material knocked loose by the cleaning rollers 15, 16 and 17 is separated by means of the screens 18, 19 and 20 and falls into the hopper 21, passing thence into the conveyor 8 at the bottom of the machine.

The combination of valves 10 and 11 in connection with the cleaning and separating devices above described is of special value to the ginner, for if the cotton is fairly clean and free from hulls only slight additional cleaning is necessary to prepare it for the gin, and this is obtained, as before stated, by running the cotton through the feeder section only, but if more cleaning is required, then by merely changing valve 11, this extra cleaning is accomplished. This additional cleaning is sufficient for cotton that has few hulls in it but contains a large amount of sand and leaf trash. The ability to either by-pass the cotton direct from the feeder sections to the gins, or alternatively to afford additional cleaning by passing the cotton around the three cleaning rollers 15, 16 and 17 and over the screens 18, 19 and 20 without passing through the main separating section of the device, is a characteristic feature of the present invention. The herein-described combination of by-pass valves to permit varying the amount of cleaning according to the condition of the cotton, in a machine of the present character, fulfills a long-felt need on the part of cotton ginners.

In cases where the cotton is mixed with hulls as well as sand, leaf trash, etc., complete cleaning and separation is necessary. In such cases, by merely changing valve 10 the material may be caused to pass through the entire machine, whereby the cotton will be thoroughly cleaned and separated from the hulls, leaf trash, dirt, sand, etc. The passage of the cotton through the hull separator section will now be described.

Separator section

Starting at the hopper 9, and assuming that the cotton contains enough hulls to require separation, with the by-pass valve 10 in the full line position shown in Fig. 1, the cotton will fall first into the space 22. Some of the cotton will pass directly to a saw cylinder 23, but the larger portion will fall onto a spiral picker roller 24. This picker roller carries the cotton over a screen 25, thereby giving it additional cleaning before throwing it to the saws, and with each revolution of the picker roller moving the residue towards the ends of the machine. The cotton falling directly into contact with the saws, and that which is thrown to the saws by the roller 24, together with some of the hulls, is picked up by the saws and carried up to a stripper roller 26. Such hulls and cotton as are thrown off by the saws fall back to the roller 24, are carried around it and recleaned and are again presented to the saws. The roller 24 carries pins or spikes so spiraled that the material coming in contact with it is constantly being moved toward each end of the machine, due to the spiral arrangement.

During this action of the picker roller and the saws nearly all of the cotton is taken up to the stripper roller 26 together with some of the hulls. The hulls that are not picked up by the saws are moved on to the end of the machine by the action of the roller 24 and dropped down at the end of the roller to another and similar roller 27, beneath which is a screen 47. This will be more clearly understood by referring to Figs. 5 and 8.

The lower edge of the screen 25 beneath the roller 24 is secured to an angle iron 28, and each end of the angle iron is secured to the heads or sides 29 and 30 of the casing A of the machine. To this angle iron is secured a sheet iron partition or deflector piece 31. The edge of this deflector 31 next to the saws is turned down at an angle as shown at 32 (see Figs. 1, 5 and 8), and is cut out to receive the central trough 48. This edge 32 of deflector 31 stands back from the saws about 1⅜" and extends on a line parallel with the saw cylinder forming rectangular openings U between the saws and the downturned edge 32, one on each side of the trough 48, and extending from the trough 48 to each end of the deflector 31. The openings U permit some trash and burrs and a relatively small amount of cotton to pass down into contact with the spiral picker roller 27 and prevent congestion of the large openings 33 and 34 (see Fig. 5) under the ends of roller 24. The deflector 31 with its turned down forward edge 32 does not extend entirely across the machine, but is so proportioned and placed as to leave at each end the aforementioned relatively large openings 33, 34 between its ends and the walls of the machine, through which openings such material as did not pass through the openings U will be dropped down to the ends of the spiral picker roller 27.

The arrangement of the deflector 32 is such that the material may pass freely down into contact with the roller 27, but roller 27 is prevented from throwing material back through the openings U or into contact with the saws 23 except at the large end openings 33 and 34 where, due to the absence of the deflector 32 at these points, the roller 27 is allowed to throw the residue material from the roller 24 to the saws once only, and what is not carried up by the saws then falls back to be pulled under the roller 27 and be conveyed toward the middle of the machine. After the residue from roller 24 has passed downward to roller 27, through the openings 33 and 34, and has been thrown against the saws 23 and back under the roller 27, small shields or deflectors X (see Figs. 1 and 8) at the back of the openings 33 and 34 prevent the material from being again thrown to the saws and cause it to be conveyed toward the middle of the machine meanwhile undergoing a cleaning treatment to be described more in detail hereinafter.

All partially cleaned cotton attached to the saws after passing under the stripper roller 26 passes on to a rapidly revolving brush 41 which brushes it from the saws. This cotton when brushed from the saws falls on a cleaning roller 42, and by means of a screen 43 located beneath the roller 42 is subjected to further cleaning. This cleaning operation is repeated in turn by the successive cleaning rollers 44, 17, 16 and 15 working over the respective screens 46, 18, 19 and 20, whereupon it is discharged into the passage 13 and out to the gin over apron 14. The dirt, sand and trash beaten through screens 43, 46, 18, 19 and 20 falls down hopper section 47' to conveyor 8. There is preferably a guard plate 41a above the brush 41.

The cleaning action of the machine as a whole may be considered as taking place in two stages. In the first stage which has been described above, the greater bulk of the cotton is separated from the hulls by the action of the picker roller 24, saws 23, and stripper roller 26, the cotton passing thence beneath cleaner rollers 42, 44, 17, 16 and 15 to the chute 14. In the second stage the small portion of cotton in the residue from the picker roller 24 is recovered by means of the picker rollers 27 and 49 acting in conjunction with their respective screens 47 and 54, and with the saws 23. This operation has been briefly referred to above, but will now be described in greater detail, and in this connection the construction of the picker roller 27 and its relation to the other elements of the machine will be reviewed and amplified.

Figure 4:
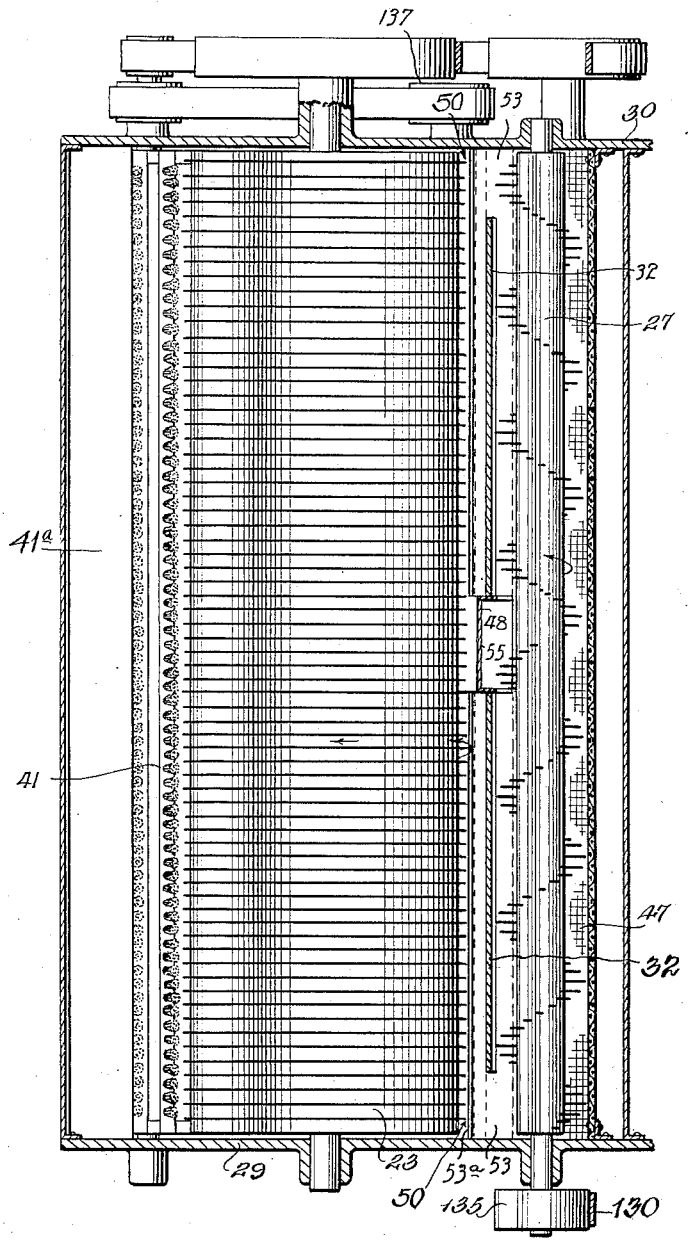
Fig. 4 is a sectional view taken on line 4—4 of Fig. 1, showing the saws, and a spirally spiked conveyor roll with a subjacent perforate trough for separating trash and dirt from the residue of cotton received from picker roll conveyor 24.

It will be noted in reference to picker roller 27 that the turned down edge 32 of plate 31 acts as a deflector to prevent the roller 27 from throwing any material over to the saws. It forms a part of the trough and serves to confine the material to the action of the spiral picker roller 27 and the cleaning screen 47 which extends the full length of the roller. At the center of the roller is the spout 48 (see Figs. 7 and 10), through which the material passes from roller 27 to a lower roller 49. On each side of the spout 48 and extending to the ends 29 and 30 of the machine are the sheet metal parts 53 (Figs. 1, 4 and 10), which form a partition between the rollers 27 and 49, the only access for material passing from roller 27 to roller 49 being through the trough 48. This partition section 53 has turned back lips 53a at the top which clear the saws about ⅝" and this leaves a passage 50 between the saws and the partition 53 (see Figs. 1 and 10), through which cotton adhering to the saws may pass without being wiped back to the space below. The lips 53a being turned back toward the roller 49 form a baffle to prevent burrs being deflected upward into the saws. The movement of the saws and the restricted space 50 (Fig. 10) between the saws and the partition 53 effectively prevents any material passing from roller 27 to roller 49 except through the center spout 48.

Roller 27 carries pins or spikes spiraled in such a manner as to convey material from the ends towards the center. This roller receives at each end all the material from the roller 24 except the portion that falls through the passages U between the saws and the deflector 32. This material consists of whole and broken burrs, stems, leaf trash, sand, etc., with some cotton, and being mixed in with so much foreign matter, this cotton is in a poor condition to go back to the saws until it has been thoroughly recleaned of the finer particles of dirt and trash adhering to it. Should it be returned to the saws without recleaning, it would lower the grade of all the cotton coming from the machine. To meet this condition, there is provided according to this invention, an efficient cleaning device in the spiral picker roller 27 operating in conjunction with the screen 47. I have found that by conveying the residue from the picker roller 24 over the screen 47 by means of the spiral picker roller 27 and delivering the same to the spout 48, it is possible to deliver to roller 49 material consisting almost entirely of whole burrs and clean locks of cotton.

This material falling on roller 49 is first conveyed beyond the sides of the spout 48 and is then repeatedly thrown upward against the saws 23, the cotton adhering to the saws being carried up through the openings 50 between the saws and partitions 53 and on around to the revolving brush 42, while the hulls being rejected by the saws, fall back to the screen bottom trough 54 below the picker roller 49, and are conveyed to the ends of this trough and dropped into conveyor 60. The screen bottom 54 is placed under the picker roller 49, so that fine dirt and trash will drop through onto the trash conveyor 60 whereby to keep the cotton as clean as possible at this final reclaiming operation of the machine. Longitudinally extending partitions 51, 52 are carried by the sides of the trough 54 and seal same from the subjacent area.

It will be noted that there is comparatively quite a long space from the partition 51, where practically all material is thrown into contact with the saws by roller 49, to the upper end of the companion trough partition 52 adjacent which the saws pass over the baffle lip 53a of partition 53 of trough 47. This gives ample time for the hulls and other foreign matter to be thrown off from the saws and prevent their being drawn through the opening 50 between the partition 53 and the saws, but the cotton will be held by the saw teeth and carried on to the brush 41. It will be further noted that the top 55 of the spout 48 is extended around the saws 23 and secured to the channel iron 56 together with the metal partition 57, which partition extends the full length of the machine. The top 55 of the spout 48 forms a guard at the center and in line with the spout 48 to prevent any material from being thrown against the saws until it has been conveyed away from the spout.

It will be noted also that the screen bottom 54 under the picker roller 49 (see Fig. 6) does not extend the full length of the roller 49, but is of such a length and is so placed as to leave an opening at each end through which burrs, trash, etc., drop into conveyor 60. These openings are indicated as 58 and 59 in Figure 6. The conveyor 60 also receives all the screenings from the screens 25, 47 and 54, and conveys them along with the hulls through an opening in the head of the machine to an outside spout, not shown, through which they fall into the main hull conveyor 8.

In most machines of this type, a stationary stripper or deflector plate as shown at 40 is supplied to prevent material passing over the stripper roller in an uncleaned condition and thus lowering the sample of the outgoing cotton. But experience has shown that a single deflector plate, no matter where located, is inadequate to prevent this action, because any particle of trash, hulls or cotton rebounding against the stripper roller and entering a depression between the stripping bars or ribs on same at the time such depression is passing under the deflector plate will be carried under the plate also, no matter what the form or location of the deflector plate may be. To overcome this condition, I have devised a dual stripper comprising a deflector plate 40 and a curved stationary plate Y with a passage Z between (see Fig. 1). The action of this combination is as follows:

The greater bulk of the cotton, trash and hulls when stripped from the saws by stripper roller 26 is thrown against the lower end of the partition W (Figure 1) and deflected downward to the spiral roller 24, to be recleaned over the screen 25 and again presented to the saws. A considerable portion of the material, however, will be carried upward by the saws 26 and will be thrown against the curved deflector Y and deflected downward to the roller 24. Some of the material carried upward by the roller 26 will find its way into a depression in the roller 26 and will be carried past the plate Y. Centrifugal force here drives this material outward and into contact with the stripper plate 40 by which it is deflected through the passage Z and falls onto the roller 24. The depression in roller 26 now being free from material, and it being impossible for other material to rebound into a depression during the transit of such depression across the passage Z, there is no contamination of the outgoing cotton from this source as would be inevitable with a single stripper plate. It is obvious that yet other deflector plates might be employed should conditions arise to require them.

A curved sheet metal housing V secured at its top to the angle iron N has its bottom rolled or bent around a small iron rod V extending from head 29 to head 30. This housing causes a stream of air generated by the rapidly revolving stripper roller 26 to flow between the saws and the stripper roller as indicated by the arrow a, Figure 1. This air current tends to remove and blow back into the front of the machine light trash and pieces of hulls that would otherwise pass between the stripper roller and the saws and mix with the outgoing cotton.

Another important feature of the machine is the recleaning mechanism which includes the spiral picker roller 27 within the screen 47, deflectors 31 and 32 and partition 53, which form a housing around the roller 27 so that all the material being received at each end must be subjected to a scrubbing, beating and conveying action over the screen 47. This action has been found to be very effective in recleaning the few remaining locks of cotton remaining in the burrs, and disposing of the finer trash so that all the whole burrs and clean cotton may be presented to the saws by roller 49 for final separation. Actual experience has shown that the employment of this cleaning arrangement results in much cleaner cotton than where it is not employed.

According to the preferred embodiment of my invention, the stripper roller 26 is made adjustable, this being likewise an important feature of my invention.

*Adjustable stripper roller*

It has been found that owing to the different kinds and conditions of cotton, one bale often varies in quality from the next sufficiently to require a different adjustment of the stripper roller 26. For best results, I have designed a quick adjustment for the stripper roller as follows: the stripper roller shaft 87 is mounted at each end in swing bearings 64 (Figs. 2 and 3) suspended from stud pins 65 in the heads 29 and 30 at each end of the machine. The lower end of one of these bearings 64 is suspended by an adjustable link 67 (Fig. 3) from a pin in a short lever arm 68, which is keyed or otherwise fastened to the shaft 69 extending across the top of the machine. To the other end of the shaft 69 (Fig. 2) is fastened the double lever or bell crank 70 from the short arm of which the lower end of bearing 64 is suspended by a similar adjustable link 67. Pivoted to the lower end of the long arm of double lever 70 is a latch or rack bar 71, which extends to the front of the machine and ends in a suitable handle. Attached to the head 30 of the machine is a catch 72, which engages with notches 73 on the latch bar 71 and holds the parts in adjustment until changed by the gin operator. It will be seen that a forward movement of the latch bar 71 raises the stripper roller away from the saws, while a backward movement of the latch bar 71 lowers the stripper roller, bringing it nearer to the saws, this arrangement permitting a very quick adjustment.

*Feed regulation*

The amount of cotton delivered to the common type of gin is dependent on hand adjustment of the feeder regulator. Some makes of gins, however, are provided with automatic feed control mechanism, whereby the cotton supply to the gin is controlled by a pressure plate inside the roll box, and in order to make the present machine adaptable to both types of gins, I have designed a special feed control mechanism for my separator, which will now be described.

In common with nearly all feeding devices the amount of cotton being fed to the gins by my machine depends upon the speed of the feeding rollers 2 and 3. As shown in Fig. 3, to one end of each of the shafts 74, 74 of the feeder rollers 2 and 3 are secured intermeshing gears 75, 75. Meshing with one of these gears is a pinion 75a attached to a ratchet wheel 76. Mounted on a stud pin 77 is a rocker arm 90 carrying two pawls 78 and 79, which are in contact with the ratchet wheel 76. To this rocker arm 90 is pivoted a connecting rod 91 to the lower end of which is adjustably attached a forked yoke 92. Pivoted as at 92a between the forks of yoke 92 is a collar 93. This collar is slidable on the rod 80 which forms a part of a rocker arm 94. This rocker arm 94 is pivotally mounted on a fixed stud pin 81, which is secured to the head of the machine. Extending upward from the rocker arm 94 and forming a part of the same is an arm 82. Pivoted to this arm is a connecting rod 83 which is adjustably connected to a bearing 95. This bearing 95 is mounted on a crank pin 84 secured in a disc 96, which is fastened by suitable means to the shaft 85 of the conveyor 6 (see Fig. 1), the arrangement being such that the rotation of the disc 96 imparts a reciprocating swinging motion to the rocker arm 94. When the collar 93 is against the stop 97 on the end of the rocker arm 94, the maximum movement is imparted to the rocker arm 90, which accordingly imparts a maximum movement to the ratchet wheel 76 through the pawls 78 and 79, and when the collar 93 is against the stop 97', the yoke pivot 92a and rocker arm pivot 81 are in line and there is no motion imparted to the connecting rod 91, and consequently the ratchet wheel 76 remains stationary.

Reference will now be made to the manual or automatic adjustment of collar 93 on rod 80 to vary the stroke of 91 and the speed of rollers 2. With the collar 93 sliding rather loosely along the rod 89, at the end of each upward and downward swing and at the moment when the reverse swing begins, there is a brief period when friction between the collar 93 and the bar or rod 89 is virtually eliminated and at this moment a very slight impulse imparted to bar 98, which is connected to yoke pivot 92a, is sufficient to cause a change of position of the collar 93 and a consequent difference in the stroke of connecting rod 91.

At the bottom left of Fig. 3 is diagrammatically shown an automatic gin breast for which the herein-described feed control is particularly adapted. It will be seen that an excess of cotton in the gin breast E will force back the pressure plate 99, thus depressing the pivoted end 100 of the pivoted pressure lever 101. This mechanism forms no part of the present invention, but my invention is adapted to work in connection therewith. It will be seen that the depression of the pivoted end 100 through the action of the link 102 which is pivoted as at 102a to arm 103, will cause said upright arm 103 to swing forward (see Fig. 12) about its pivot 103a on plate 103b secured to head 30. This forward swinging of arm 103 through the intermediate rod 106 and latch bar 98 draws the collar 93 toward the neutral position 97', thus cutting down the supply of cotton from the feeder as the pressure builds up in the gin breast until a point is reached where the pressure against plate 99 equals the resistance of spring 104 (Fig. 3), which is adjustable for the roll density desired. Should the roll pressure decrease, the reaction of spring 104 will swing the pressure lever 101 upward at the pivot 100 and swing lever 103 backward and move the collar 93 further from the neutral point 97', and thus increase the movement of rod 91, rocker arm 90 and the ratchet wheel 76, with a consequent increase of the cotton supply to the gin breast E.

The notches in the latch bar 98 are for hand regulation where the gins do not have the roll pressure control feature, in which case the arm 103 may be connected at its lower end 105 by a link, not shown, direct to the roll box head by a special attachment. The automatic gin breast moves outward at both top and bottom when the breast is withdrawn from the saws, and with this gin it is only necessary to fasten down the pressure arm 101 to permit all hand regulation of the cotton supply. It will be noted that when the breast of this gin is moved outward from the saws, the lever 103, whether employed with the automatic or hand feed regulation, swings forward through the action of the link 102 and draws the collar 93 to the neutral position, completely cutting off the cotton supply. With gins that have a roll box hinged to the top rail of the gin, since the top of the gin breast swings inward instead of outward at the lifting of the breast, a movement the reverse of that in the automatic gin, the connection with the feed control arm 103 must be with a special link from above the hinged point of the gin breast to the hole 105 in the feed control arm 103.

Located on the inner end of the angular extension of the rod 106 is a helical torsion spring 107 (Fig. 11) having one end secured to the arm 103 and the other end secured to a collar 107a that is held in place on the angular extension of the rod 106 by a set screw 107', the arrangement being such that the turning of the collar alters the tension of the spring and the amount of force necessary to pull the arm 103 away from stop 108 on the arm 103. The purpose of this spring arrangement is to take care of any overtravel in the arm 103 and prevent springing or breaking of parts when the gin breast is thrown out of ginning position. This spring arrangement makes the control mechanism adaptable to all makes of gins by the use of suitable connecting links.

Where hand regulation only is employed, the arm 103 is held rigidly in place by a connecting link pivoted to arm 103 and the roll box head, its position being about as shown in Fig. 3 when the breast is in ginning position, in which position the arm 103 acts merely as a catch for latch bar 98, the feed adjustment being obtained by shifting the latch bar 98 to the proper notch. Should the latch 98 be set at or near the neutral point with the gin breast in ginning position, and the breast then be withdrawn from the saws, the spring on arm 106 would allow it to turn in the arm 103 and prevent breakage of parts and also make it unnecessary to readjust the feed control at the resumption of ginning.

The combination of the rocker arm 94 with its sliding collar 93, together with the control arm 103 and intermediate linkage connecting the collar 93, the control arm 103, including latch bar 98 and spring actuated rod 105, are believed to be novel features of the invention. The ratchet arm 90, pawls 78 and 79, and ratchet wheel 76, while constituting convenient mechanism for transferring movement to the feed rolls, may be substituted by equivalent mechanism without departing from the spirit of the invention. It is further evident that reciprocating motion may be imparted to the rocker arm 90 from a crank, cam or eccentric actuated from any working part of the machine. The important feature of this phase of my invention is to impart a variable swinging reciprocal movement, by any suitable means, to the rod 91 or the like, which actuates the feed rollers of the separator. The movement of the rod is variable from a given maximum to zero, and this variation may be controlled either manually or by variations in the pressure of the roll in the gin breast. The idea of automatically cutting off the entire cotton supply to the separator on the removal of the breast from ginning position is likewise believed to be an important feature of the invention.

*Driving mechanism*

The various rotating elements of my machine may be operated from any suitable source of power. As shown in Fig. 2, power is transmitted from a pulley 110 mounted on a shaft 111 upon which are carried one set of saws within the gin breast E, through a belt 112 to a main pulley 113 mounted on a main shaft 114, from which the cleaner and separator mechanism is actuated and upon which is mounted the upper roller 15 of the system of cleaner rollers 15, 16 and 17. From the pulley 113 power is transmitted through a belt 115 to a pulley 116 mounted on a shaft 117 which carries the initial picker roller 4 located just below the feed rollers 2 and 3. A smaller pulley 118 is likewise mounted on the shaft 117, and this pulley through belt 119 transmits power to a pulley 120 mounted on shaft 85 of the conveyor 6. From the conveyor shaft 85 power is transmitted to the feed rollers 2 and 3 through the adjustable linkage and ratchet mechanism previously described, and shown in Fig. 3.

Upon the main shaft 114 is mounted a second pulley 121, from which power is transmitted from shaft 114 to a pulley 122 mounted upon the shaft 123 of the lower cleaner roller 17. A third pulley 124 mounted on the end of shaft 114 opposite pulleys 113 and 121 transmits power through belt 125 to pulley 126 mounted upon shaft 127 which carries intermediate cleaner roller 16.

The above system of belting, etc., operates the entire feeding and cleaning system which functions when the valves 10 and 11 are both in the dotted line positions shown in Fig. 1, as previously described. This mechanism may be operated entirely separately from the hull separating mechanism which constitutes the principal portion of my machine. By thus running the feeder and cleaner without the hull separating mechanism, there results a great saving in wear and tear upon such mechanism, and also a saving in power. This feature is of great value, since the first cotton of the season is generally practically free from hulls, and in many localities more than one-half of the crop will have been ginned before there is any need for the hull separator.

As shown, the hull separator mechanism is actuated by suitable belting from the main shaft 114, but an arrangement is made for throwing the hull separating mechanism out of operation without affecting the cleaning and feeding mechanism. As shown in Fig. 2, a long belt 130 passes over a pulley mounted on the shaft 114, thence about pulley 122, and then about pulleys 131, 132, 133, 134 and 135 actuating various elements of the separator mechanism. The remaining elements of the separator mechanism are actuated through suitable belting (see Fig. 3) actuated from a pulley 137 mounted on the opposite end of shaft 136 from the pulley 131. Thus all the separator mechanism will be driven from the single belt 130.

As shown in Fig. 2, the belt 130 passes over an idler pulley 140 carried by an arm 141 of a belt crank lever pivoted at 142. The longer arm 143 of the lever is pivotally connected at 144 to a rack bar 145 having notches 146, any one of which may be engaged by a suitable cleat 147 and held in adjusted position. By means of the rack bar 145 the tension of the belt may be adjusted as desired or the belt may be thrown out of operation entirely, leaving only the cleaning and feeding mechanism in operation.

What I claim is:

1. In a cotton handling apparatus, a hull separator comprising a casing having a hopper-like dirt collecting bottom, means in the casing for preliminarily treating the cotton to separate the greater portion of the cotton from the hulls and trash, means for removing the hull portion and subjecting it to further treatment to separate out the remainder of the cotton, and means comprising sets of screens and superjacent rolls, the sets arranged in intersecting planes outwardly of and adjacent opposite sides of the hopper-like bottom for cleaning the separated cotton.

2. In a cotton handling apparatus or the like including a driven stripper roll, a pair of circumferentially spaced primary and secondary deflectors of angular cross section adjacent said stripper roll and said deflectors providing a material passage therebetween, and the primary one of said deflectors providing a downwardly acting deflecting surface whose upper end terminates adjacent the inlet of said passage.

3. In a cotton cleaning and hull separating apparatus, a rotating saw cylinder, a picker roller mounted adjacent the saw cylinder, means for feeding cotton to the picker roller, a screen beneath the picker roller for separating dirt from said cotton, a deflector plate extending from one edge of the screen toward the saws, said plate having a down-turned portion adjacent the saws, whereby trash and hulls pass over said plate, a second picker roller below said deflector plate receiving material therefrom, a screen beneath the second picker roller, means including said deflector plate and down-turned portion for intercepting material actuated around by said second picker roller and substantially keeping the same from being thrown to the saw cylinder, and a third picker roller for treating such material from the second picker roller as does not pass through the screen.

4. In a cotton cleaning and hull separating apparatus, a rotating saw cylinder, a picker roller mounted adjacent the saw cylinder, means for feeding cotton to the picker roller, a screen beneath the picker roller for separating dirt from said cotton, a deflector plate extending from one edge of the screen toward the saws, said plate having a down-turned portion adjacent the saws, whereby dirt and trash-like material passes over said plate and drops below the same, a second picker roller below said deflector plate receiving material therefrom, a screen beneath the second picker roller, means including said deflector plate and down-turned portion for intercepting material actuated around by said second picker roller and substantially keeping the same from being thrown to the saw cylinder, and a third picker roller for treating such material from the second picker roller as does not pass through the screen, said third picker roller coacting with the saws to break up any remaining hulls and separate the cotton therefrom.

5. In combination with a cotton gin having an automatic gin breast, a cotton handling apparatus for supplying cleaned cotton to the gin breast, said apparatus including moving feeding and cleaning mechanism, and means for automatically cutting off the feeding mechanism on removal of the gin breast from the ginning position, said cut-off means for said feeding mechanism including a driven pivotally supported rocker, a feed mechanism drive lever slidably and pivotally carried by said rocker and having its pivot movable over said rocker pivot, and a connection between said lever and gin breast for pulling said lever pivot over said rocker pivot when the gin breast is moved out of ginning position.

6. Cotton handling apparatus comprising in combination, a gin having a movable breast, means for cleaning and supplying cotton to the gin breast, said means including feed rolls, means for operating said feed rolls, means for stopping operation of the feed rolls on movement of the gin breast from ginning position, an actuating lever fulcrumed between its ends and constituting an element of the feed roll stopping means, gin breast carried means connectible with said actuating lever for rocking it on its fulcrum upon movement of the gin breast, and means for connecting said gin breast carried means with said actuating lever on either side of the fulcrum of said actuating lever.

7. In a cotton handling machine comprising a gin, and a cotton feeding and cleaning apparatus for delivering cotton thereto; means for automatically controlling the cotton feed in accordance with gin conditions, said means comprising a variable speed change mechanism operatively connected with the feeding apparatus, a control member for varying the speed of said change mechanism, a lever fulcrumed between its ends on said cleaning apparatus, an operating connection between said control member and one end of said lever, a link pivotally connected at one end to said lever between its connection with the control member and its fulcrum, and a gin carried member mounted thereon for movement in response to gin conditions, said link being pivotally connected at its other end to said gin carried member.

8. In a cotton cleaning, hulling, and separating mechanism, a saw cylinder, a conveyor roll adjacent thereto for moving cotton longitudinally along the saw cylinder in contact therewith, a second conveyor roll beneath said first named roll, means for delivering material from said first roll to said second roll at the ends of the latter, a third conveyor roll beneath said saw cylinder and said first and second rolls, means for delivering material from the center of said second roll at and to the center of said third roll, and means for preventing the engagement of said saw cylinder with material being delivered at the central portion of said third roll.

9. In a cotton hulling, cleaning and separating mechanism, a saw cylinder, a conveyor roll adjacent thereto for moving cotton longitudinally of said cylinder in contact therewith, means for delivering material from the ends of said roll, a second conveyor roll adjacent said saw cylinder beneath said first named roll and receiving at its ends material discharged from said first roll, a baffle between said rolls and terminating in inwardly spaced relation from each end of the rolls, a third conveyor roll adjacent the saw cylinder beneath said cylinder below and to one side of said second roll, a trough beneath said second roll, a material delivery chute between the central portion of said trough and the central portion of said third roll, baffle means between said second and third rolls except at said chute, and an arcuate guard covering the area of said saw cylinder immediately above the extent of said chute and the central portion of said third roll.

10. In a cotton handling apparatus, a hull separator including revolving saws and a stripper roll cooperating therewith for preliminarily separating the bulk of cotton from the hulls and trash, means for removing the separated cotton from the saws, and a pair of deflectors adjacent one side of the stripper roll for preventing the passage of hulls therearound, said deflectors being spaced apart to provide a discharge passage therebetween for such hulls as are thrown off the stripper roll after passing the first deflector or which are removed by the second deflector.

11. In a cotton handling apparatus, a hull separator including revolving saws and a stripper roll cooperating therewith for preliminarily separating the bulk of cotton from the hulls and trash, means for removing the separated cotton from the saws, a pair of deflectors adjacent one side of the stripper roll for preventing the passage of hulls therearound, said deflectors being spaced apart to provide a passage therebetween for such hulls as are thrown off the stripper roll after passing the first deflector or which are removed by the second deflector, and means for further treating the hull portions received from said deflectors and stripper roll to separate any cotton remaining therewith.

12. A cotton handling apparatus as set forth in claim 11, in which the secondary hull treating apparatus includes a conveyor means and screen adjacent the saws, and means for substantially preventing the conveyor from throwing material against the saws.

13. A cotton handling apparatus as set forth in claim 11, in which the secondary hull treating apparatus includes a picker roll and screen located on the opposite side of the saws from the means which removes the cotton from the saws, a second picker roll located below the first mentioned roll, and a centrally arranged chute for discharging material from the first roll to the second, the second roll cooperating with the revolving saws in the further separation of the remaining cotton from the hull.

ALFRED R. MUIRHEAD.